May 27, 1941.    F. R. D'ENTREMONT    2,243,553
ELECTRICAL WINDING
Filed Feb. 24, 1940

Inventor:
Franklin R. D'Entremont,
by Harry E. Dunham
His Attorney.

Patented May 27, 1941

2,243,553

UNITED STATES PATENT OFFICE 2,243,553

ELECTRICAL WINDING

Franklin R. D'Entremont, Lynn, Mass., assignor to General Electric Company, a corporation of New York Application February 24, 1940, Serial No. 320,596

3 Claims. (Cl. 175—21)

This invention relates to insulated electrical windings, and more particularly to means for anchoring connection leads thereto.

Electrical windings for induction apparatus such as transformers are usually provided with a protective covering of insulating material including a coating of a suitable insulating compound such as asphaltum to prevent the entrance of moisture or air into the windings which may seriously affect the electrical characteristics of the device. Leads which are brought out through the insulation are often subjected to mechanical strains which may result in the cracking of the compound coating adjacent the windings, or even the insulation of the lead itself. Moisture laden air penetrating into the windings through these cracks may so weaken the dielectric strength of the internal insulation or lead insulation that it will break down at less than rated voltage conditions.

It is therefore a general object of this invention to provide an insulated electrical winding having a new and improved arrangement for anchoring the connection leads thereto whereby the danger of breakage of the insulation around the leads adjacent the windings is greatly minimized.

Figure 1:
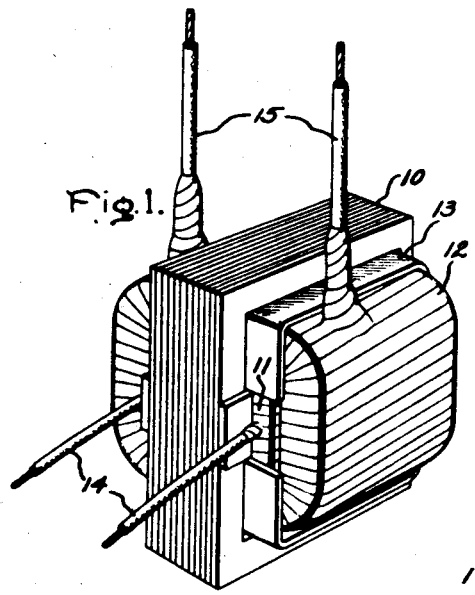
Figure 2:
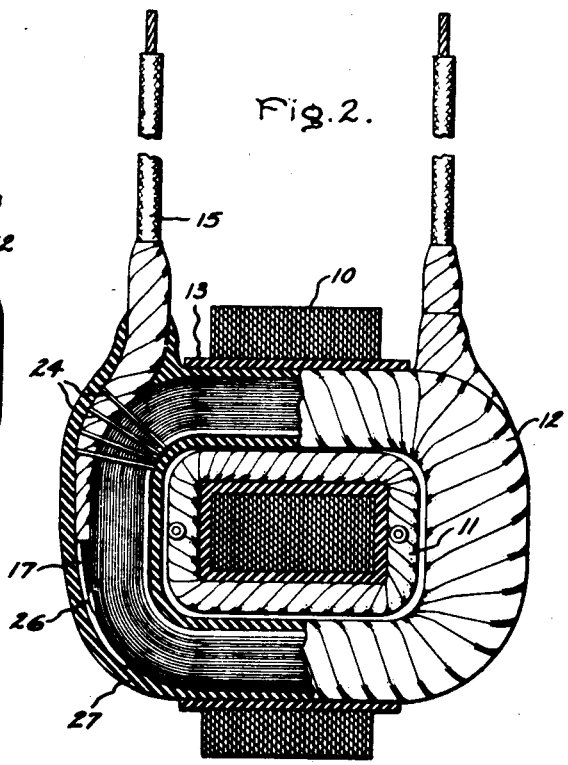
Figure 4:
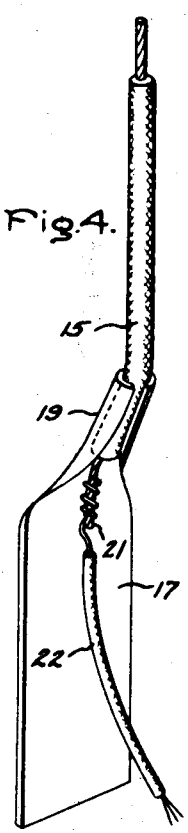
Figure 5:
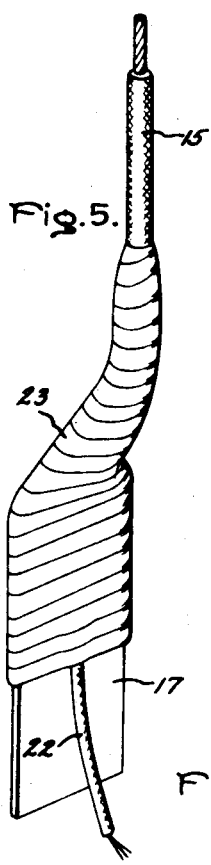
Figure 3:
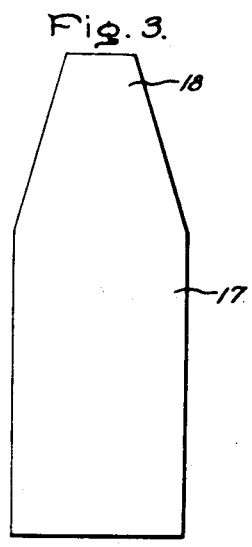

For a consideration of what I believe to be novel and my invention, attention is directed to the following description and the claims appended thereto taken in connection with the accompanying drawing in which Fig. 1 is a perspective view of a transformer having a winding which is provided with leads anchored to the winding in accordance with one form of my invention; Fig. 2 is a side elevation of the transformer partly in section illustrating certain details of the winding and lead assembly; Fig. 3 is a plan view of a sheet of insulating material; Fig. 4 is a view in perspective illustrating the sheet of insulating material of Fig. 3 after it has been formed and applied to an end of a connection lead; Fig. 5 is a perspective view of the lead assembly of Fig. 4 with insulation wrapping applied.

Referring now to the drawing, the invention is illustrated as applied to the primary winding of a potential transformer. The transformer comprises a rectangular laminated magnetic core structure 10 having an inner secondary winding 11 and an outer primary winding 12 provided upon the central winding leg of the core structure. Preformed sheets of suitable insulating material 13 are provided between the windings and the core structure. The secondary winding 11 is provided with suitable leads 14, the primary winding with leads 15 for connection to the transformer terminals. In this case the primary winding is to be subjected to the relatively high voltages of the line whereas the secondary winding provides the low voltage for the measuring instrument or meter to be connected thereto. Because the primary leads will be subjected to relatively rough usage, the conductors will be of relatively large size though the conductor size of the winding itself may be relatively small. Due to the large cross-section of the primary leads, they will be relatively stiff so that any handling thereof as during the assembly of the transformer or subsequent use thereof may impose considerable stress upon the insulation covering which may result in the cracking thereof adjacent the winding.

For anchoring the primary leads to the windings, I secure to the end of each lead a relatively stiff anchor member 17 of insulating material such as pressed paper or fiber, which in turn is bound to the coil by the insulation wrapping provided therearound. The anchor member may be formed from a relatively wide flat sheet, one end 18 of which is tapered to a reduced width. The opposite edges of the narrow end 18 are rolled over by any suitable means to form a ferrule 19 for cooperatively receiving the end of the lead 15. The tapered end of the sheet is also bent at an angle with respect to the lower end thereof so that the lead and anchor assembly will conform with the contour of the winding coil adjacent a corner thereof. While it is to be understood that the end of the winding may be directly connected to the lead tip 21, for greater ease in the assembly of the structure I prefer to solder the end of an auxiliary lead 22 thereto as indicated. The auxiliary lead 22 is a relatively short length of insulated wire, preferably stranded, for greater flexibility which in turn may subsequently be soldered or otherwise suitably secured to the end of the winding. With the insulated lower portion of the lead 15 fitted in the ferrule 19 and with the auxiliary lead 22 soldered to the end of the lead conductor, the assembly is tightly wrapped with insulation 23 such as is shown in Fig. 5. This wrapping will further secure the lead 15 to the ferrule 19 and cover the connection between the auxiliary lead 22 with the main lead to keep the exposed joint from contacting directly with the turns of the winding and possibly puncturing the insulation thereof.

The lead assembly of Fig. 5 is first fastened to the winding coil by a few turns 24 of a suitable cord adjacent a corner thereof, so that the joint of the main and auxiliary leads lies under the anchor member. Due to the preformed angle in the end of the anchor member, it will fit snugly against the corner of the coil while the outer end of the ferrule will project slightly outwardly therefrom. With the lead assembly thus tied to the coil, the outer end of the auxiliary lead 22 may be secured as by soldering to the end of the winding coil, the connection therewith being suitably insulated as indicated at 26 and tucked under the unwrapped lower end of the anchor member. The anchor member is preferably of such a length that the lower end extends slightly beyond the lower corner of the winding coil. This end of the member is bent to fit around the coil, and the coil assembly is then wound tightly with wrapping of suitable insulation to the desired thickness as indicated at 27. After the wrapping has been completed, the coil assembly may be suitably dried and then treated in a suitable insulating compound such as asphaltum. By this arrangement bending of the lead 15 as during the mounting of the transformer within the case and connection of the leads to the terminals will not crack or otherwise injure the insulation wrapping 27. The lead anchoring member being bound tightly to the coil and the lower end thereof being hooked around the lower corner of the coil beneath the insulation wrapping, the lead cannot be pulled from the winding even by abnormally rough usage of the unit.

Since the lead assembly is secured to the coil with the connection joints beneath the anchor sheet, a smooth outer surface is presented and the joints are thoroughly protected with only a slight increase in the overall size of the coil.

Having described the principle of my invention together with the apparatus which I now consider to represent the best embodiment thereof, I desire to have it understood that the arrangement shown is merely illustrative and that the invention may be carried out by other means.

What I claim as new and desire to secure by Letters Patent of the United States, is:

1. The combination of an electrical winding comprising a plurality of turns of relatively fine wire, a relatively heavy flexible lead for said winding, a relatively wide flat sheet of insulating material having one end tapered and deformed to define a ferrule cooperatively receiving the end of said lead, a relatively small flexible conductor connecting the end of said lead to said winding, insulation wrapping around said ferrule and the end of said lead including the connection with said conductor, insulation wrapping around said winding and binding the flat portion of said sheet against the side of said winding, said sheet conforming to the configuration of said winding and rigidly anchoring the end of said lead thereto, the end of said ferrule extending from the surface of said winding a distance at least equal to the thickness of the insulation surrounding the main body of said winding.

2. The combination of an electrical winding, a lead connected to an end of said winding, a lead anchor member of insulating material having a relatively rigid portion substantially surrounding said lead adjacent said winding, insulation wrapping around said portion and the lead portion extending outwardly therefrom and a flat portion securely fastened against said winding.

3. The combination of an electrical winding, a lead connected to an end of said winding, a relatively wide flat sheet of insulating material having an end projecting from said winding, the opposite edges of said end rolled around said lead, insulation wrapping around said end and the lead extending therefrom, and means including insulation wrapping for said winding securely binding the flat portion of said sheet to said winding.

FRANKLIN R. D'ENTREMONT.